US007514162B2

(12) United States Patent
Berger et al.

(10) Patent No.: US 7,514,162 B2
(45) Date of Patent: Apr. 7, 2009

(54) PERPENDICULAR MAGNETIC RECORDING MEDIUM WITH METAMAGNETIC ANTIFERROMAGNETICALLY-COUPLED LAYER BETWEEN THE SOFT UNDERLAYER AND RECORDING LAYER

(75) Inventors: Andreas Klaus Berger, San Jose, CA (US); Eric E. Fullerton, Morgan Hill, CA (US); Olav Hellwig, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 594 days.

(21) Appl. No.: 11/185,659

(22) Filed: Jul. 19, 2005

(65) Prior Publication Data

US 2007/0020486 A1 Jan. 25, 2007

(51) Int. Cl.
G11B 5/66 (2006.01)
G11B 5/673 (2006.01)
(52) U.S. Cl. .................................. 428/828.1; 428/829
(58) Field of Classification Search .................. None
See application file for complete search history.

(56) References Cited

U.S. PATENT DOCUMENTS

| | | | | |
|---|---|---|---|---|
| 6,468,670 | B1 * | 10/2002 | Ikeda et al. | 428/611 |
| 6,686,070 | B1 | 2/2004 | Futamoto et al. | |
| 6,773,834 | B2 * | 8/2004 | Do et al. | 428/828 |
| 6,815,082 | B2 * | 11/2004 | Girt | 428/828.1 |
| 6,835,475 | B2 | 12/2004 | Carey et al. | |
| 2003/0022023 | A1 * | 1/2003 | Carey et al. | 428/694 MM |

OTHER PUBLICATIONS

Girt et al., "Antiferromagnetically Coupled Perpendicular Recording Media", IEEE Trans. on Magnetics, vol. 39, No. 5, Sep. 2003, pp. 2306-2310.
Matsunumu et al. "Very High-Density . . . Recording Media Including New Layer-Structure 'U-Mag'", IEEE Trans. on Magnetics, vol. 41, No. 2, Feb. 2005, pp. 572-576.
Carcia et al., "Perpendicular Magnetic Anisotropy in Pd/Co Thin Film Layered Structures", Appl. Phys. Lett., vol. 47, pp. 178-180 (1985).
Hellwig, et al., "A new phase diagram for layered antiferromagnetic films", Nature Materials, vol. 2, Feb. 2003, pp. 112-116.
Rossler et al., "Synthetic metamagnetism—magnetic switching of perpendicular antiferromagnetic superlattices", JMMM 269 (2004) L287-L291.

* cited by examiner

*Primary Examiner*—Kevin M Bernatz
(74) *Attorney, Agent, or Firm*—Thomas R. Berthold

(57) ABSTRACT

A perpendicular magnetic recording medium includes a metamagnetic antiferromagnetically-coupled (AFC) layer between the recording layer (RL) and the soft magnetically permeable underlayer (SUL). The metamagnetic AFC layer has essentially no net magnetic moment in the absence of a magnetic field, but is highly ferromagnetic in the presence of a magnetic field above a threshold field. Thus the metamagnetic AFC layer does not contribute to the readback signal during reading, but channels the write field to the SUL during writing because the threshold field is selected to be below the write field. An exchange-break layer EBL is located between the metamagnetic AFC layer and the RL. The metamagnetic AFC layer contains films with a crystalline structure suitable as a growth template for the EBL and RL, so the metamagnetic AFC layer also functions as part of an "effective EBL", thereby allowing the actual EBL to be made as thin as possible.

16 Claims, 6 Drawing Sheets

PERPENDICULAR MAGNETIC RECORDING MEDIUM WITH METAMAGNETIC ANTIFERROMAGNETICALLY-COUPLED LAYER BETWEEN THE SOFT UNDERLAYER AND RECORDING LAYER

BACKGROUND OF INVENTION

1. Field of the Invention

This invention relates generally to perpendicular magnetic recording media, and more particularly to a disk with a perpendicular magnetic recording layer for use in magnetic recording hard disk drives.

2. Description of the Related Art

Perpendicular magnetic recording, wherein the recorded bits are stored in a perpendicular or out-of-plane orientation in the recording layer, is a promising path toward ultra-high recording densities in magnetic recording hard disk drives. The most common type of perpendicular magnetic recording system is one that uses a "probe" or single pole recording head with a "dual-layer" media as the recording disk, as shown in FIG. 1. The dual-layer media comprises a perpendicular magnetic data recording layer (RL) formed on a "soft" or relatively low-coercivity magnetically permeable underlayer (SUL), with the SUL serving as a flux return path for the field from the pole recording head. In FIG. 1, the RL is illustrated with perpendicularly recorded or magnetized regions, with adjacent regions having opposite magnetization directions, as represented by the arrows. The magnetic transitions between adjacent oppositely-directed magnetized regions are detectable by the read element or head as the recorded bits.

FIG. 2 is a schematic of a cross-section of a prior art perpendicular magnetic recording disk showing the write field $H_w$ acting on the recording layer RL. The disk also includes the hard disk substrate, a seed or onset layer (OL) for growth of the SUL, an exchange-break layer (EBL) to break the magnetic exchange coupling between the magnetically permeable films of the SUL and the RL and to facilitate epitaxial growth of the RL, and a protective overcoat (OC). As shown in FIG. 2, the RL is located inside the gap of the "apparent" recording head (ARH), which allows for significantly higher write fields compared to longitudinal or in-plane recording. The ARH comprises the write pole (FIG. 1) which is the real write head (RWH) above the disk, and an effective secondary write pole (SWP) beneath the RL. The SWP is facilitated by the SUL, which is decoupled from the RL by the EBL and by virtue of its high permeability produces a magnetic mirror image of the RWH during the write process. This effectively brings the RL into the gap between the RWH and the SWP and allows for a large write field $H_w$ inside the RL.

One type of material for the RL is a conventional granular cobalt alloy, such as a CoPtCr alloy. This conventional material has out-of-plane perpendicular magnetic anisotropy as a result of the c-axis of its hexagonal-close-packed (hcp) crystalline structure being induced to grow perpendicular to the plane of the layer during deposition. To induce this growth, the EBL onto which the RL is formed is also typically a material with an hcp crystalline structure. Thus ruthenium (Ru) is one type of material proposed for the EBL. The granular cobalt alloy RL should also have a well-isolated fine-grain structure to produce a high-coercivity media and to reduce inter-granular exchange coupling, which is responsible for high intrinsic media noise. Enhancement of grain segregation in the RL has been proposed by the addition of metal oxides, including oxides of Si, Ti and Ta, which precipitate to the grain boundaries.

A perpendicular magnetic recording medium has been proposed wherein the RL is an antiferromagnetically-coupled (AFC) recording layer of two ferromagnetic layers, each having perpendicular magnetic anisotropy, separated by a coupling layer that mediates antiferromagnetic (AF) coupling. In this type of medium, as described in U.S. 6,815,082 B2, both the first or lower ferromagnetic layer and the second or upper ferromagnetic layer are formed of a conventional granular cobalt alloy. Thus in a perpendicular magnetic recording medium with an AFC RL, the EBL would also have to have an hcp crystalline structure to induce the perpendicular magnetic anisotropy of the lower layer in the AFC RL. The AF-coupling layer induces perpendicular antiferromagnetic exchange coupling between the two ferromagnetic layers, as depicted in FIG. 3 by the antiparallel magnetization directions between the two ferromagnetic layers in each magnetized region of the AFC RL. The upper ferromagnetic layer is formed with a higher magnetic moment than the lower ferromagnetic layer, typically by making it thicker, so that the AFC RL has a net magnetic moment in the absence of a magnetic field.

The best performance for writing perpendicular magnetic recording media is obtained when the EBL is as thin as possible, i.e., the minimum thickness required to provide magnetic decoupling of the SUL and the RL, so that flux can readily pass through the EBL during the write process. However, while a reduction in thickness of the EBL is desirable, there are other reasons why the EBL has a certain thickness. First, the EBL should be thick enough to provide the template for the growth of the cobalt alloy RL to cause its c-axis to be perpendicular. A relatively thick Ru EBL also provides an RL with high coercivity and low enough inter-granular exchange coupling to minimize the intrinsic media noise. Thus, if Ru is used as the EBL it should be at least approximately 80 Å thick for current RL materials. An additional reason for a relatively thick EBL is given by the fact that the SUL also affects the read-back amplitude of the magnetic transitions as read by the read element or head. In particular, low-frequency transitions have much higher amplitudes. The thinner the EBL the greater is the amplitude increase at low frequency. Therefore, when the EBL is too thin the dynamic amplitude range that the read head needs to be sensitive to is quite large. This makes design of the read head and associated read circuitry very challenging.

What is needed is a perpendicular magnetic recording medium with an effective EBL, that is or appears thin during the write process for maximum write field enhancement, but is or appears thicker during the readback process to limit the low field signal amplitude and the dynamic range of the read sensor.

SUMMARY OF THE INVENTION

The invention is a perpendicular magnetic recording medium that includes a "metamagnetic" antiferromagnetically-coupled (AFC) layer between the RL and the SUL. The AFC layer is called "metamagnetic" because it has essentially no net magnetic moment in the absence of a magnetic field, but is highly ferromagnetic in the presence of a magnetic field above a threshold field $H_{th}$. Thus the metamagnetic AFC layer does not contribute to the readback signal during reading, but channels the write field $H_w$ to the SUL during writing because $H_{th}$ is selected to be below the write field $H_w$. An EBL is located between the metamagnetic AFC layer and the RL.

Additionally, because the metamagnetic AFC layer contains films with a crystalline structure suitable as a growth template for the EBL and RL, the metamagnetic AFC layer also functions as part of an "effective EBL", thereby allowing the actual EBL to be made as thin as possible. A nonmagnetic separation layer (NSL) is located between the metamagnetic AFC layer and the SUL.

In the preferred embodiment the metamagnetic AFC layer has at least two multilayers with an antiferromagnetically (AF) coupling layer separating adjacent multilayers. Each multilayer is a stack of alternating first and second films, with one of the first or second films being Co or a Co alloy (including a CoFe alloy), and the other of the films being Pt, Pd, Au or Ni. This type of multilayer has strong perpendicular magnetic anisotropy, but as used in the invention the multilayers are not intended to function as recording layers and thus have high intergranular exchange coupling and low coercivity. The AF-coupling layer has a thickness sufficient to induce perpendicular antiferromagnetic exchange coupling between the two multilayers. The antiferromagnetic exchange field induced by the AF-coupling layer is greater than the coercivities of the two multilayers, so that the perpendicular magnetizations of the two multilayers are substantially antiparallel in the absence of a magnetic field. In addition, the two multilayers have substantially the same magnetic moments so that in the absence of a magnetic field their antiparallel magnetizations essentially cancel and the metamagnetic AFC layer has essentially no net magnetic moment.

Additionally, the first and second films in the multilayers of the metamagnetic AFC layer have a face-centered-cubic (fcc) (111) crystalline structure, which is a suitable template to encourage the epitaxial growth of the c-axis oriented (0002) hcp material of the RL. Thus because the metamagnetic AFC layer below the actual EBL also promotes the growth of the RL in the same way the nonmagnetic EBL does, its thickness can be included with the actual EBL thickness. Therefore, the thickness of the actual EBL can be made substantially thinner. Thus, the effective EBL (EBL+AFC Layer+NSL) appears to be magnetically "thin" during the write process because the metamagnetic AFC layer becomes highly ferromagnetic during writing (when $H_w$, is greater than $H_{th}$) and channels the flux to the SUL.

For a fuller understanding of the nature and advantages of the present invention, reference should be made to the following detailed description taken together with the accompanying figures.

DETAILED DESCRIPTION OF THE INVENTION

Figure 4:
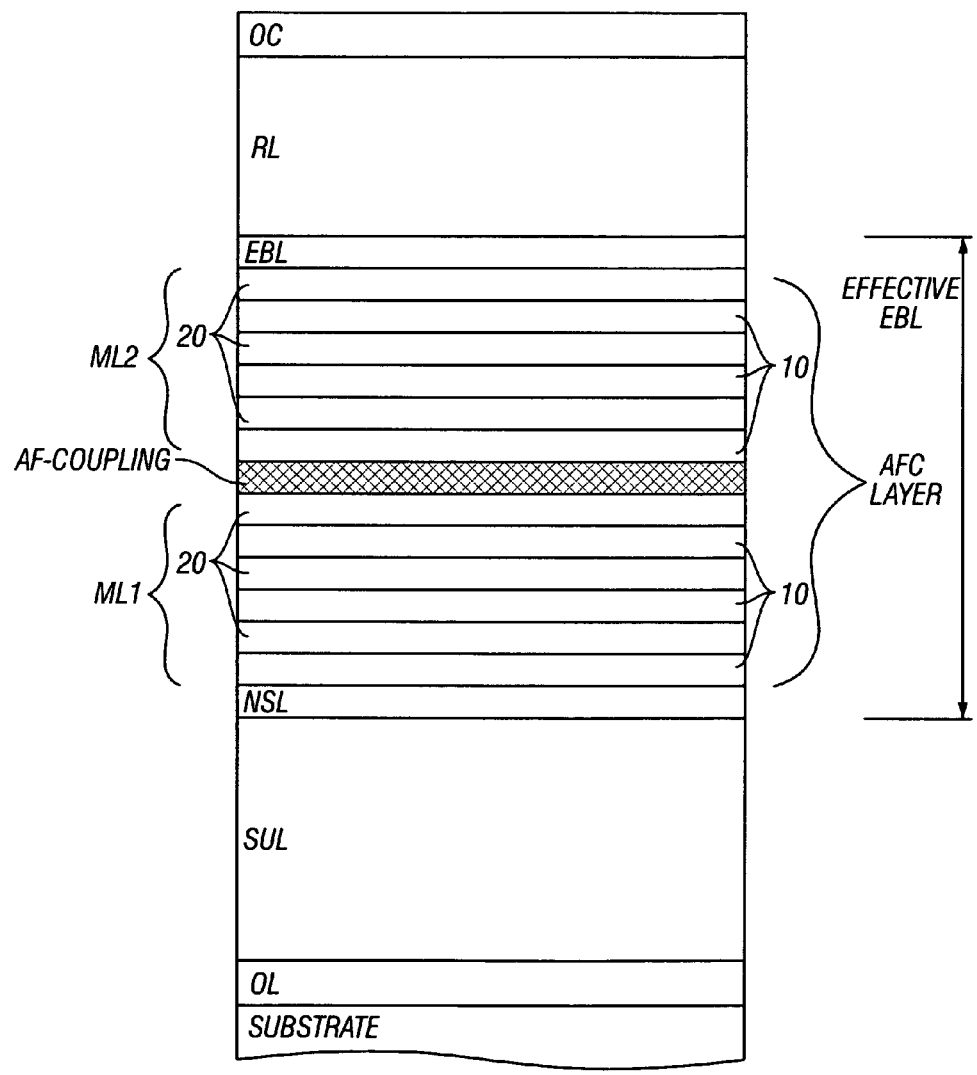
FIG. 4 is a schematic of a cross-section of a perpendicular magnetic recording disk according to the present invention having a metamagnetic AFC layer and an effective exchange-break layer (EBL) with a substantially thinner actual EBL than the prior art disk of FIG. 3.

The perpendicular magnetic recording medium according to the present invention is illustrated in FIG. 4. The structure includes a "metamagnetic" AFC layer between the EBL and the SUL and a nonmagnetic separation layer (NSL) between the AFC layer and the SUL. The term metamagnetic is typically used to refer to a material that is antiferromagnetic in the absence of a magnetic field but undergoes a transition to ferromagnetic at an applied threshold field ($H_{th}$) and remains ferromagnetic at an applied field above $H_{th}$. In the present invention the AFC layer is called "metamagnetic" because it has essentially no net magnetic moment in the absence of a magnetic field, but is highly ferromagnetic in the presence of a magnetic field above its threshold field $H_{th}$. Thus the AFC layer does not contribute to the readback signal during reading, but channels the write field to the SUL during writing because $H_{th}$ has been selected to be below the write field $H_{th}$. Additionally, because the AFC layer contains films with a crystalline structure suitable as a growth template for the EBL and RL, the AFC layer also functions as part of an "effective EBL", thereby allowing the actual EBL to be made as thin as possible, as shown in FIG. 4.

Referring to FIG. 4, the various layers making up the disk are located on the hard disk substrate. The substrate may be any commercially available glass substrate, but may also be a conventional aluminum alloy with a NiP or another known surface coating, or an alternative substrate, such as silicon, canasite or silicon-carbide. In certain embodiments, the SUL is located on the substrate, either directly on the substrate or directly on an adhesion layer or OL. The OL facilitates the growth of the SUL and may be an AlTi alloy or a similar material with a thickness of about 20 to 50 Angstroms. The SUL may be formed of amorphous magnetically permeable materials such as alloys of FeCoB, CoCuFe, NiFe, FeAlSi, FeTaN, FeN, FeTaC, CoTaZr, CoFeB, and CoZrNb with a thickness in the range of approximately 500 to 4000 Angstroms. The SUL may also be a laminated or multilayered SUL formed of multiple soft magnetic films separated by nonmagnetic films, such as electrically conductive films of Al or CoCr. The SUL may also be a laminated or multilayered SUL formed of multiple soft magnetic films separated by interlayer films that mediate an antiferromagnetic coupling, such as Ru, Ir, or Cr, as described in U.S. Pat. Nos. 6,686,070 B1 and 6,835,475 B2.

The EBL is located on top of the AFC layer, either directly on the AFC layer or on an optional seed layer (SL) formed on the AFC layer. The EBL acts to break the magnetic exchange coupling between the RL and the AFC layer. The EBL is preferably a material with a hexagonal-close-packed (hcp) crystalline structure, such as Ru, that promotes the epitaxial growth of the hcp RL so that the c-axis of the hcp RL is oriented substantially perpendicular, thereby resulting in perpendicular magnetic anisotropy. Ruthenium (Ru) is a commonly used material for the EBL, but other materials include a metal selected from Ti, Re, and Os, and an alloy containing at least one element selected from Ti, Re, Ru, and Os. If Ru is used as the EBL, it may be formed on a suitable hcp or face-centered-cubic (fcc) SL, such as a 20-40 Angstrom thick layer of NiFe, formed on the SUL. While a single-layer EBL is depicted in FIG. 4, the EBL may be a multilayer structure, with one or more hcp layers.

A nonmagnetic separation layer (NSL) is located between the SUL and the AFC layer. The NSL acts to break the magnetic exchange coupling between the AFC layer and the magnetically permeable films of the SUL. The NSL may be essentially any nonmagnetic material, such as Ru, Ta, Ti, Cr, Pd, Pt, Cu that is also compatible with the growth of the films making up the AFC layer.

The RL may be any type of known material or structure for use as a perpendicular magnetic RL, but is preferably a layer of granular cobalt alloy with an hcp crystalline structure that exhibits perpendicular magnetic anisotropy, such as a CoPt or CoPtCr alloy, with or without an oxide, such as oxides of Si, Ti and Ta. The RL has a typical thickness of 100 to 250 Angstroms. While a single-layer RL is depicted in FIG. 4, the RL may also be an AFC RL, like the type described in the previously-cited U.S. Pat. No. 6,815,082 B2.

The OC formed on top of the RL may be an amorphous "diamond-like" carbon film or other known protective overcoats, such as Si-nitride.

Referring again to FIG. 4, the detailed structure of the metamagnetic AFC layer will be explained. The AFC layer comprises at least two multilayers ML1, ML2 with an antiferromagnetically (AF) coupling layer separating adjacent multilayers. Each multilayer is a stack of alternating first films 10 and second films 20. One of the first or second films is Co or a Co alloy (including a CoFe alloy), and the other of the films is Pt, Pd, Au or Ni. Any two perpendicularly adjacent films form a pair of alternating films, with at least one and typically several pairs forming each multilayer. This type of multilayer, sometimes called a "superlattice", is described by Carcia et al., "Perpendicular Magnetic Anisotropy in Pd/Co Thin Film Layered Structures", *Appl. Phys. Lett.*, Vol. 47, pp. 178-180 (1985). It has strong perpendicular magnetic anisotropy and has been proposed as a perpendicular magnetic recording layer. However, the grains in these multilayers are strongly exchange-coupled laterally which results in high intrinsic media noise and thus a low signal-to-noise ratio (SNR). In this invention ML1 and ML2 are not intended to function as recording layers and thus have high intergranular exchange coupling and low coercivity, typically less than about 500 Oe. The nonmagnetic AF-coupling layer between ML1 and ML2 is formed of a material selected from the group consisting of ruthenium (Ru), chromium (Cr), rhodium (Rh), iridium (Ir), copper (Cu), and their alloys. The AF-coupling layer has a thickness, typically between about 5 to 12 Å, sufficient to induce perpendicular antiferromagnetic exchange coupling between ML1 and ML2. The antiferromagnetic exchange field induced by the AF-coupling layer is greater than the coercivities of ML1 and ML2, so that the perpendicular magnetizations of ML1 and ML2 are substantially antiparallel in the absence of a magnetic field. In addition, ML1 and ML2 have substantially the same magnetic moments so that in the absence of a magnetic field their antiparallel magnetizations essentially cancel and the AFC layer has essentially no net magnetic moment. The properties of Co/Pt multilayers with perpendicular magnetic anisotropy and AF-coupled with Ru have been described by Hellwig, et al., "A new phase diagram for layered antiferromagnetic films", *Nature Materials*, Vol. 2, February 2003, pp. 112-116.

The structure shown in FIG. 4 has just two multilayers (N=2) and a single AF-coupling layer. However the AFC layer may have more than two multilayers (N>2), with (N-1) AF-coupling layers so that there is an AF-coupling layer located between adjacent multilayers. For AFC layers where N>2, the thicknesses and materials of the individual multilayers must be selected so that the net magnetic moment of the AFC layer is substantially equal to zero in the remanent magnetic state.

Figure 5:
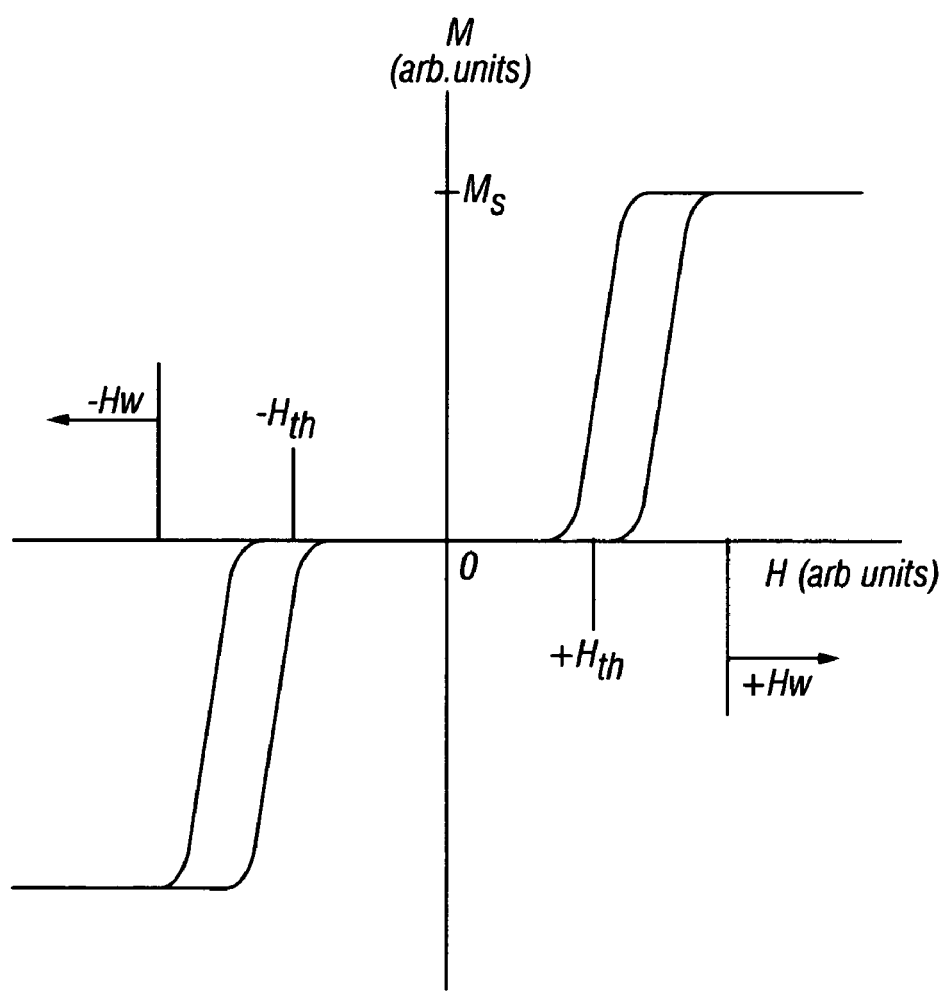
FIG. 5 is an idealized M-H loop for the metamagnetic AFC layer in the disk of the present invention.

FIG. 5 is an idealized M-H hysteresis loop for the metamagnetic AFC layer. At remanence (H=0), the AFC layer has no net magnetic moment because ML1 and ML2 are AF-coupled and their generally equal magnetic moments are antiparallel and cancel. At a threshold field $H_{th}$ the AF-coupling is overcome, the magnetic moments of ML1 and ML2 become parallel, and the AFC layer has a net magnetic moment. The write field $H_w$ for perpendicular magnetic recording systems is typically greater than about 14 kOe, so during writing the AFC layer has a saturation magnetization $M_s$. The AFC layer can be made to have a desired value of $H_{th}$ by selection of the materials for the first and second films, the thicknesses of the films and the number of pairs of films in the multilayers. For a write field $H_w$, of about 14 kOe, a desired range of values for $H_{th}$ is about 3 to 11 kOe. The lower bound of this range has to be larger than the perpendicular magnetic field $H_{RL}$ produced by the RL bit pattern inside the metamagnetic layer. If $H_{th}$ were smaller than $H_{RL}$ then the metamagnetic layer would behave very similar to a conventional SUL. The upper bound of this range is given by the short-time coercivity of the RL, which is typically about 60-90 percent of the maximum head write field, because it is desirable to write to the RL at the point of the largest field gradient. If $H_{th}$ were much larger than 11 kOe, which is about 80 percent of a 14 kOe write field, the metamagnetic layer would not function during the writing process at the points where it is intended that the head write the information.

To demonstrate the present invention, different AFC layers were fabricated. In one structure, each of ML1 and ML2 was [4 Å Co/7 Å Pt]$_5$ (5 Co/Pt pairs of films) separated by a 8.7 Å Ru layer, $H_{th}$ was about 1 kOe, and the saturation magnetization was about 700 emu/cm$^3$. In a second structure, each of ML1 and ML2 was [4 Å Co/7 Å Pt]$_3$ separated by a 5 Å Ir layer, $H_{th}$ was about 10 kOe, and the saturation magnetization was about 700 emu/cm$^3$. In a third structure, each of ML1 and ML2 was [4 Å Co/8 Å Pd]$_4$ separated by a 6 Å Ru layer, $H_{th}$ was about 3 kOe, and the saturation magnetization was about 600 emu/cm$^3$.

In the structure of FIG. 4, the "effective EBL" is the combined thickness of the NSL, the metamagnetic AFC layer and the actual EBL. Additionally, the films 10, 20 in the AFC layer have a face-centered-cubic (fcc) (111) crystalline structure, which is well-known as a suitable template to encourage the epitaxial growth of a c-axis oriented (0002) hcp material. Thus because the AFC layer below the actual EBL also promotes the growth of the RL in the same way the nonmagnetic EBL does, its thickness can be included with the actual EBL thickness with respect to meeting the current 80 Å thickness requirement. Therefore, the thickness of the actual EBL can now be substantially less than the approximately 80 Å required by the prior art structure. The effective EBL (EBL+ AFC Layer+NSL) appears to be magnetically "thin" during the write process because the AFC layer becomes highly ferromagnetic during writing and channels the flux to the SUL. However, the effective EBL has a thickness sufficient to grow a high-coercivity, low-noise RL. The actual EBL can be as thin as approximately 10 Angstroms, in which case the AFC layer and NSL would have a total thickness of at least approximately 70 Angstroms.

Figure 1:
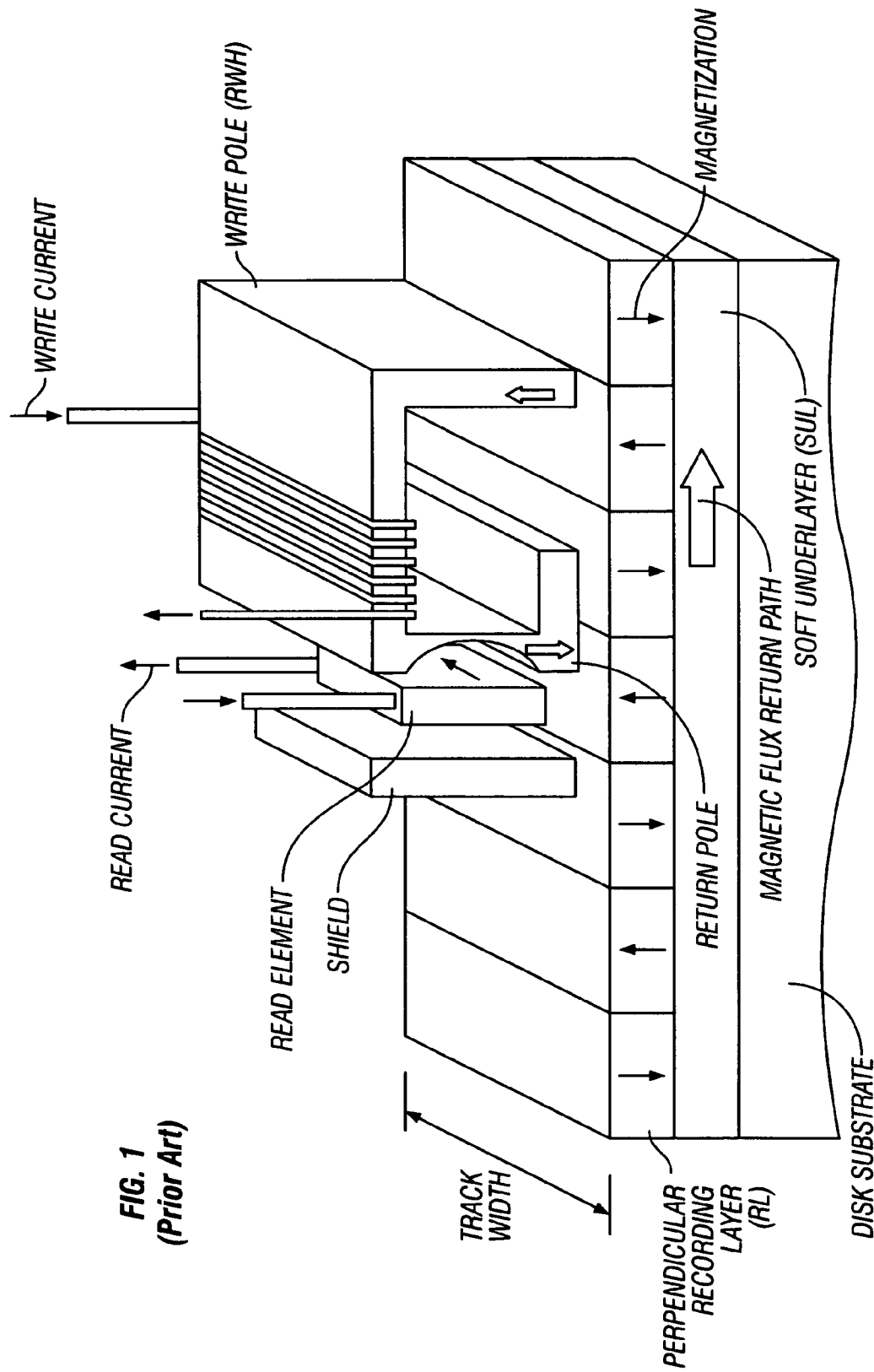
FIG. 1 is a schematic of a prior art perpendicular magnetic recording system.

An additional problem with perpendicular magnetic recording systems (FIG. 1) is that the SUL also affects the read-back amplitude of the magnetic transitions as read by the read element or head. In particular, low-frequency transitions have much higher amplitudes. The thinner the EBL, i.e. the smaller the physical spacing between the SUL and the RL, the greater is the amplitude increase at low frequency. Therefore, when the EBL is thin, the dynamic amplitude range that the read head needs to be sensitive to is quite large. This makes design of the read head and associated read circuitry very challenging. Therefore, although it is beneficial to have a thin EBL for writing it can be problematic for reading. The present invention solves this problem because the effective EBL is thin for writing, yet the spacing between the SUL and the RL is not physically decreased. Thus with the present invention the advantage of having a thin EBL is obtained for writing without the deleterious effects it would have on reading.

Figure 2:
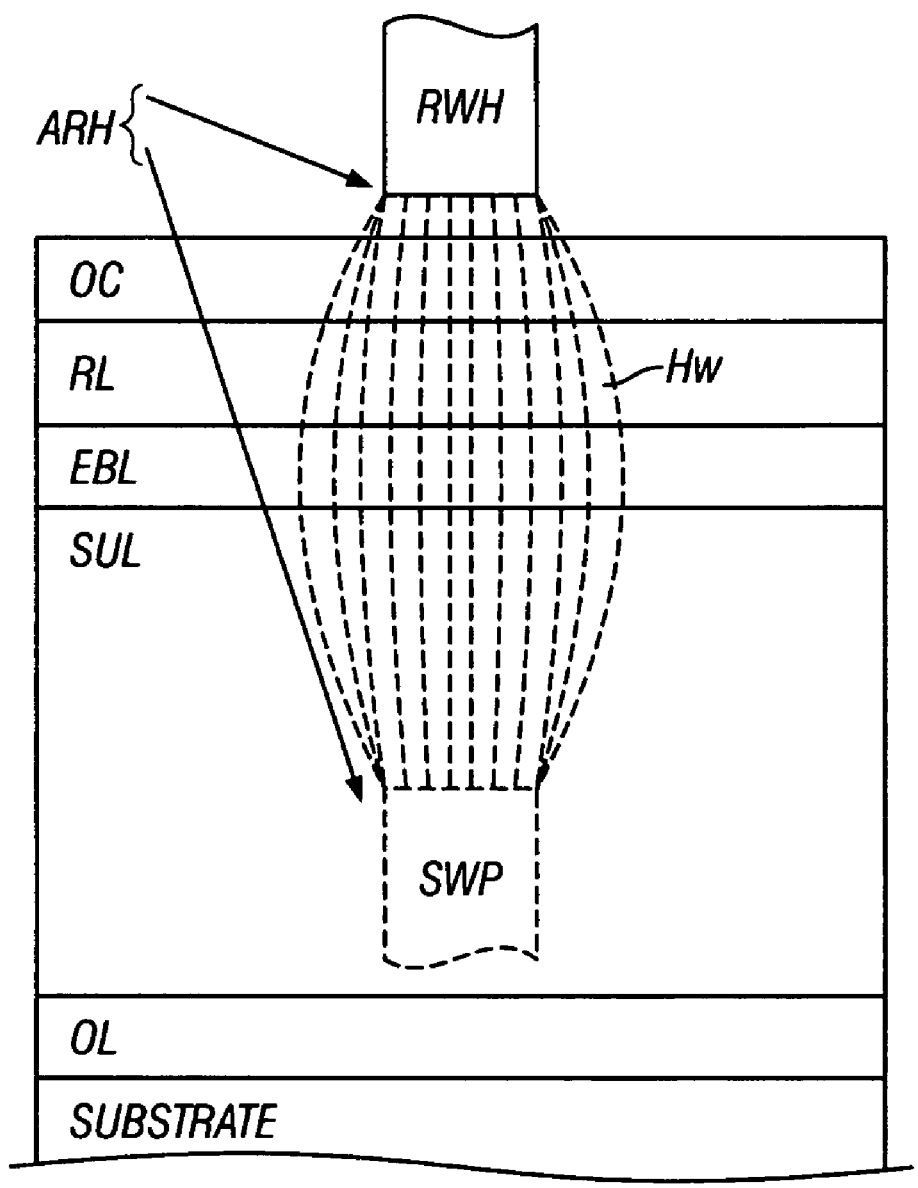
FIG. 2 is a schematic of a cross-section of a prior art perpendicular magnetic recording disk showing the write field $H_w$, acting on the recording layer (RL).
Figure 3:
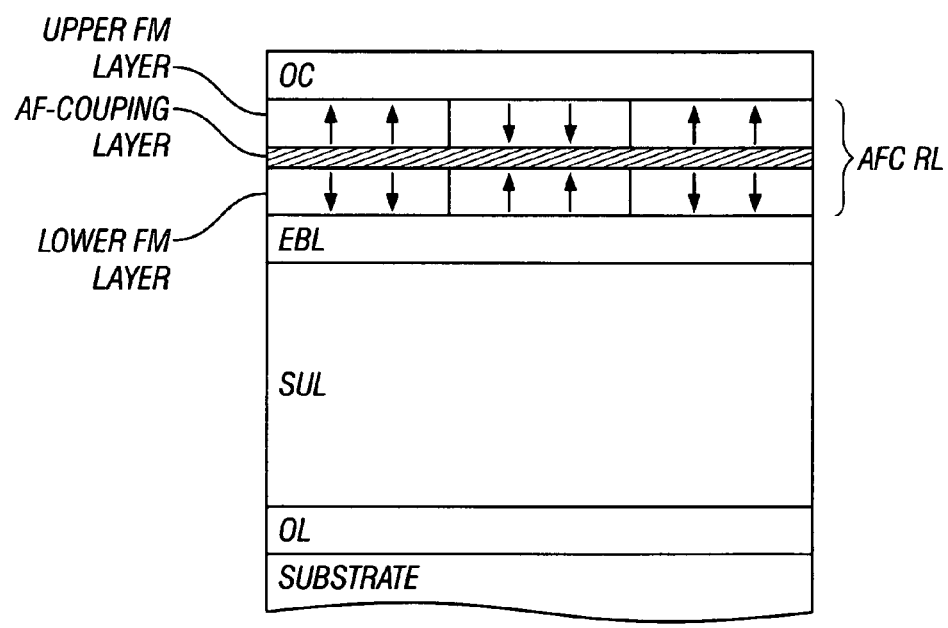
FIG. 3 is a schematic of a cross-section of a perpendicular magnetic recording disk having an antiferromagnetically-coupled (AFC) RL according to the prior art.
Figure 6:
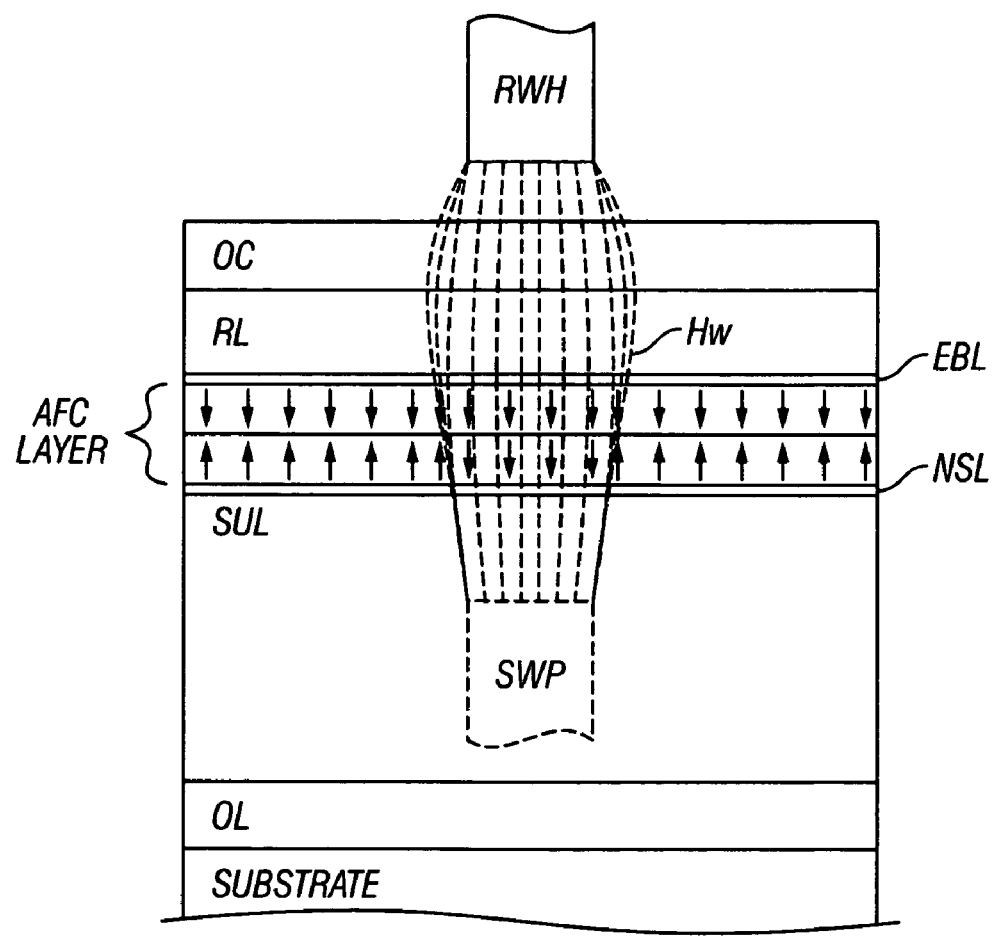
FIG. 6 is a schematic illustration of the reduction in the write bubble in the disk of the present invention with the metamagnetic AFC layer.

Because the metamagnetic AFC layer becomes highly ferromagnetic during writing, with the perpendicular magnetizations of the multilayers aligned parallel, it acts to channel the flux to the SUL and thus reduces the size of the "write bubble". The write bubble is essentially the dimension in the horizontal plane where the field is greater than or equal to $H_w$. A small write bubble is desirable to prevent writing to adjacent data tracks. The effect of the metamagnetic AFC layer to reduce the write bubble is illustrated schematically in FIG. 6, which can be compared with the schematic illustration of FIG. 2.

While the invention has been described with Co as one of the two alternating films in the multilayers, Co alloys and CoFe alloys may be used in place of pure Co.

The metamagnetic AFC layer has been described with two multilayers and one AF-coupling layer. However, the metamagnetic AFC layer may have more than two multilayers with adjacent multilayers separated by an AF-coupling layer.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording medium comprising:
   a substrate;
   an underlayer of magnetically permeable material on the substrate;
   a perpendicular magnetic recording layer comprising a granular Co alloy having perpendicular magnetic anisotropy on the underlayer;
   an antiferromagnetically-coupled (AFC) layer between the underlayer and the recording layer and having perpendicular magnetic anisotropy and substantially no net magnetic moment in the absence of an applied magnetic field, the AFC layer comprising a first multilayer of at least one pair of alternating first and second films, a second multilayer of at least one pair of alternating first and second films, and a nonmagnetic antiferromagnetically-coupling layer between the first and second multilayers, the first and second multilayers being perpendicularly antiferromagnetically exchange coupled across the antiferromagnetically-coupling layer and having perpendicular magnetizations substantially antiparallel in the absence of an applied magnetic field and substantially parallel in the presence of a magnetic field above a threshold field, the first film being Co or a Co alloy and the second film being selected from the group consisting of Pt, Pd, Au and Ni;
   a nonmagnetic separation layer between the AFC layer and the underlayer; and
   an exchange-break layer between the AFC layer and the recording layer for magnetically decoupling the recording layer and the AFC layer.

2. The medium of claim 1 wherein the Co alloy of the first film comprises Co and Fe.

3. The medium of claim 1 wherein the nonmagnetic antiferromagnetically-coupling layer of the AFC layer is formed of a material selected from the group consisting of ruthenium (Ru), chromium (Cr), rhodium (Rh), iridium (Ir), copper (Cu), and their alloys.

4. The medium of claim 1 wherein the AFC layer further comprises a third multilayer of alternating first and second films, and a nonmagnetic antiferromagnetically-coupling layer between the second multilayer and said third multilayer.

5. The medium of claim 1 wherein the exchange-break layer is a material selected from the group consisting of Ru, Ti, Re, Os, and an alloy of one or more of Ru, Ti, Re, and Os.

6. The medium of claim 1 wherein the exchange-break layer has a thickness less than approximately 80 Angstroms.

7. The medium of claim 1 wherein the combined thickness of the nonmagnetic separation layer, the AFC layer and the exchange-break layer is at least approximately 80 Angstroms.

8. The medium of claim 1 wherein the Co alloy of the recording layer comprises a CoPt alloy and wherein the recording layer further comprises an oxide or oxides of one or more of Si, Ti and Ta.

9. The medium of claim 1 wherein the recording layer is an antiferromagnetically-coupled (AFC) recording layer comprising first and second Co alloy layers having perpendicular magnetic anisotropy and separated by a nonmagnetic antiferromagnetically-coupling layer, the AFC recording layer having a substantial net magnetic moment in the absence of an applied magnetic field.

10. The medium of claim 1 wherein the underlayer is formed of a material selected from the group consisting of alloys of CoFe, CoNiFe, NiFe, FeCoB, CoCuFe, FeAlSi, FeTaN, FeN, FeTaC, CoTaZr and CoZrNb.

11. The medium of claim 1 wherein the underlayer is a lamination of multiple magnetically permeable films separated by nonmagnetic films.

12. The medium of claim 11 wherein the nonmagnetic films in the lamination provide antiferromagnetic coupling of the magnetically permeable films in the lamination.

13. A perpendicular magnetic recording disk comprising:
   a substrate;
   an underlayer of magnetically permeable material on the substrate;
   a nonmagnetic separation layer on the underlayer;
   a first multilayer on the separation layer and having perpendicular magnetic anisotropy, the first multilayer comprising alternating first and second films, the first film being Co or a Co alloy and the second film being selected from the group consisting of Pt, Pd, Au and Ni;
   a second multilayer having perpendicular magnetic anisotropy and a magnetic moment substantially the same as the magnetic moment of the first multilayer in the absence of a magnetic field, the second multilayer comprising alternating first and second films, the first film being Co or a Co alloy and the second film being selected from the group consisting of Pt, Pd, Au and Ni;
   a nonmagnetic antiferromagnetically-coupling layer between the first and second multilayers for perpendicularly antiferromagnetically coupling the first and second multilayers, the moments of the first and second multilayers being substantially antiparallel and thereby canceling one another in the absence of a magnetic field, the antiferromagnetically-coupling layer being a material selected from the group consisting of Ru, Cr, Rh, Ir, Cu, and their alloys;
   a perpendicular magnetic recording layer comprising a granular Co alloy having perpendicular magnetic anisotropy; and an exchange-break layer between the second multilayer and the recording layer for magnetically decoupling the recording layer and the second multilayer.

14. The disk of claim 13 wherein the first film of the first and second multilayers comprises a CoFe alloy.

15. The disk of claim 13 wherein the combined thickness of the nonmagnetic separation layer, the first and second multilayers, the antiferromagnetically-coupling layer and the exchange-break layer is at least approximately 80 Angstroms.

16. The disk of claim 13 wherein the exchange-break layer is a material selected from the group consisting of Ru, Ti, Re Os, and an alloy of one or more of Ru, Ti, Re, and Os.

* * * * *